United States Patent [19]

Mannheimer et al.

[11] 3,990,911
[45] Nov. 9, 1976

[54] SOLID ELECTROLYTE GALVANIC CELL

[76] Inventors: Manfred Mannheimer, 9838 N. Kendall Drive; Daniel E. Speers, 8901 SW. 110 St., both of Miami, Fla. 33176

[22] Filed: Feb. 24, 1971

[21] Appl. No.: 118,435

[52] U.S. Cl. ................................ 429/5; 429/191
[51] Int. Cl.² ............... H01M 23/00; H01M 11/00
[58] Field of Search .............. 136/83, 86, 153–155, 136/6, 3, 89, 100; 310/3; 252/301.1

[56] References Cited
UNITED STATES PATENTS

| | | | |
|---|---|---|---|
| 1,217,739 | 2/1917 | Flannery | 136/6 X |
| 2,690,465 | 9/1954 | Broder | 136/153 |
| 3,019,358 | 1/1962 | Ohmart | 310/3 |
| 3,057,945 | 10/1962 | Rinnovatore et al. | 136/83 |
| 3,189,485 | 6/1965 | Panzer | 136/93 |
| 3,219,486 | 11/1965 | Gumucio | 136/86 |
| 3,255,044 | 6/1966 | Powers et al. | 136/86 |
| 3,271,196 | 9/1966 | Oswin | 136/86 |
| 3,318,734 | 5/1967 | McCully | 136/6 |
| 3,375,135 | 3/1968 | Moulton et al. | 136/6 |
| 3,483,037 | 12/1969 | Wagle | 136/89 |

OTHER PUBLICATIONS

Oldenberg, O., Introduction to Atomic Physics, Second Edition, N. Y., McGraw-Hill, 1954, p. 278.

*Primary Examiner*—Anthony Skapars
*Attorney, Agent, or Firm*—Giles C. Clegg, Jr.

[57] ABSTRACT

Disclosed is a method of increasing ionic conductivity of solid electrolytes, such as salts, metal oxides and the like, and an electrochemical galvanic cell utilizing a solid, anhydrous electrolyte which includes a radioactive source for increasing conductivity of the solid electrolyte.

14 Claims, 4 Drawing Figures

DANIEL E. SPEERS
MANFRED MANNHEIMER

INVENTORS

SOLID ELECTROLYTE GALVANIC CELL

This invention relates to galvanic cells. More particularly it relates to electrochemical cells having two electrodes of different potential separated by a solid electrolyte to convert chemical energy into electrical energy. More generally, it relates to a method of increasing the ionic conductivity of solid electrolytes by exposing them to high energy sources such as X-rays, gamma rays, beta radiation, etc.

Galvanic cells comprised of a pair of electrodes of different potential separated by an electrolyte are well known in the art. Classically such cells are comprised of first and second metals of first and second potentials separated by first and second salts of said metals. Generally, however, such galvanic cells employ aqueous solutions of the salts causing corresponding problems of cell leakage, short shelf-life and the like.

There is considerable interest in the use of solid electrolytes because of their many obvious advantages over aqueous electrolyte solutions. However, the development of electrochemical cells using solid electrolytes has been severely limited by the extremely low ionic conductivity which is characteristic of solid salts, metal oxides and similar compounds used for such solid electrolytes. Because of the low conductivity of solid electrolytes, solid electrolyte cells have such a high internal resistance that appreciable current flow through the cell is not achieved. Therefore such cells have found little commercial value.

In accordance with the present invention a galvanic cell is provided which utilizes a solid electrolyte interposed between electrodes of different potential. However, the conductivity of the solid electrolyte is greatly increased by the inclusion therein of an energy source such as a radioactive isotope which vastly increases the conductivity of the electrolyte, resulting in an electrochemical cell with relatively low internal resistance.

Energy from radioactive isotopes absorbed by solid electrolyte materials causes alteration of the resistivity of the electrolyte material, resulting in increased conductivity of the electrolyte. It has been discovered that radioactive isotopes may be introduced into solid electrolyte materials in sufficient quantities to drastically alter their ionic conductivity without deleteriously affecting their use as an electrolyte. Using such solid electrolyte materials a galvanic cell may be produced with low internal resistance. By lowering the internal resistance of the cell appreciable current flow through the cell may be obtained, thereby producing a commercially practical solid electrolyte cell.

The advantages of such solid electrolyte cells are manifold. It will be immediately apparent that electrochemical cells may be fabricated using anhydrous ionic materials thereby avoiding the interference of deleterious side reactions with water. Since the ionic conductivity of most such solid electrolytes is relatively insensitive to temperature changes, and since such materials generally have extremely high melting points, cells fabricated therefrom are virtually insensitive to temperature changes within normal operating ranges and may be effectively operated at temperatures ranging from cryogenic to the melting point of the electrode materials. Furthermore, cells may be fabricated using solid ionic salts of electrode materials which heretofore could not be used to produce practical galvanic cells. Practically any desired combination of electrodes can be selected from the electromotive series and used in combination with the appropriate electrolyte without regard to the normal conductivity of the electrolyte since the conductivity can be modified as desired. Therefore, electrochemical cells may be fabricated using heretofore impractical electrode materials such as flourine, lithium, beryllium, magnesium, sodium, or the like.

These and other advantages and features of the invention will become more readily understood from the following detailed description taken in connection with the appended claims and attached drawings in which:

Figure 1:
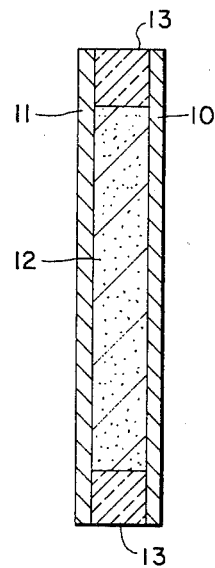
FIG. 1 is a sectional view of a galvanic cell employing two metal electrodes and a solid ionic electrolyte.

FIG. 1 illustrates a simple thermogalvanic cell comprising a pair of metallic electrodes 10 and 11 in intimate contact with opposite sides of a solid electrolyte 12. Electrodes 10 and 11 may be of like material, such as silver. Thermoelectric power is generated by the anode and cathode being held at different temperatures. Where the electrodes 11 and 10 are silver, the solid ionic electrolyte may be silver bromide, silver iodide or silver chloride or other suitable salts. Since the silver halide is utilized in solid form, a protective sealing ring 13 is disposed between the electrodes 10 and 11 adjacent the periphery of solid electrolyte 12 to seal the electrolyte 12 from the atmosphere.

Thermogalvanic cells of the general structure shown in FIG. 1 are well known. However, because of the high resistivity of silver halides, such thermogalvanic cells have not been found practical. It has been discovered, however, that by inclusion of an isotope such as cesium 137, promethium 147 or the like, the conductivity of the electrolyte is vastly increased, thereby lowering the internal resistance of the cell.

Solid ionic electrolyte structures may be formed by mixing suitable amounts of radioactive isotope with anhydrous powder of the electrolyte. The admixture may then be fused in a suitable mold or be compressed to a slug to form a solid electrolyte structure compatible with the particular cell to be fabricated. The electrodes 10 and 11 may be formed from pure metals or by electrodeposition, plating, sputtering or other suitable means to form an electrode adjacent the surface of the solid electrolyte.

Figure 2:
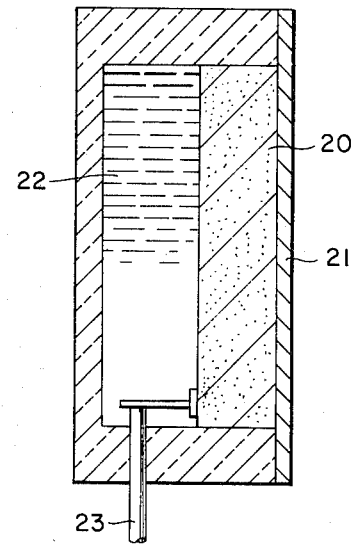
FIG. 2 is a sectional view of a galvanic cell employing a fluid electrode and a metallic electrode separated by a solid ionic electrolyte.

It will be appreciated that through the use of solid ionic electrolytes containing radioactive materials galvanic cells may be fabricated utilizing electrodes which were heretofore impractical to use for galvanic cells because of the low conductivity of the solid electrolyte. However, by including a radiation source in the electrolyte, galvanic cells may be fabricated using practically any desired electrode material. Furthermore, since the electrolyte is in solid form, one or both of the electrodes may be in liquid or gaseous form. An illustrative embodiment of such cell is illustrated in FIG. 2 which comprises a solid silver halide or another appropriate compound electrolyte 20 containing a radioactive isotope as discussed hereinabove. Adjacent one face of the electrolyte 20 is a silver or another appropriate metal electrode 21. An insulating housing fitted over the electrolyte 20 and in contact with the electrode 21 forms a cavity 22 on the side of the electrolyte 20 opposite the electrode 21 and encasing the electrolyte. Cavity 22 may be filled with a liquid or gaseous electrode such as iodine, bromine, chlorine or any other appropriate fluid. Electrical contact is made to the fluid electrode by means of a platinum, carbon, or equivalent electrode 23 extending through the housing into cavity 22 and also making electrical contact with the solid electrolyte 20.

It will also be observed that by providing the housing with appropriate inlets and outlets (not shown) a fluid electrode may be continuously passed through cavity 22 and acts through absorption on electrode 23.

Electrode 23 may be a simple pin, as shown, or may be in the form of a screen or gauze disposed within the cavity 22 and contacting the solid electrolyte 20. When the electrode is a gas or liquid of low conductivity, the cavity 22 may be filled with a suitable foraminous or porous material such as graphite or the like to provide an electrically conductive matrix for the fluid electrode. The fluid electrode may then be absorbed on the surface of the matrix material, intimately mixed therewith, or continuously passed through the matrix material.

Figure 3:
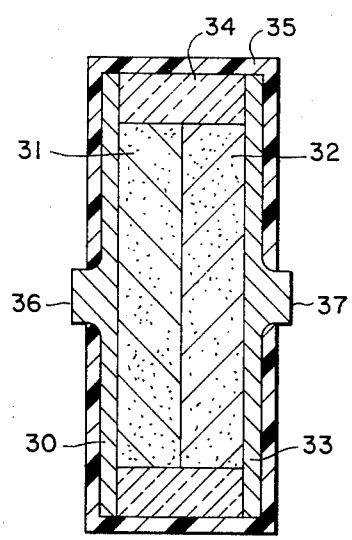
FIG. 3 is a sectional view of a galvanic cell employing dissimilar metal electrodes separated by two solid electrolytes.

An illustrative embodiment of a Daniell-type cell employing the solid electrolyte of the invention is illustrated in FIG. 3. The device of FIG. 3 comprises a first electrode 30 in contact with a first solid electrolyte 31. The first solid electrolyte 31 is in contact with a second solid electrolyte 32 which contacts a second electrode 33. For example, the device of FIG. 3 may take the form Pb/PbCl$_2$/AgCl/Ag. When the first electrode 30 is lead, the first solid electrolyte 31 is lead chloride, the second electrolyte 32 is silver chloride and the second electrode 33 is silver. An insulating material 34 may be interposed between the electrodes 30 and 33 around the periphery of the solid electrolytes 31 and 32 to encase the solid electrolytes as described hereinabove with reference to FIG. 1. Additionally, a suitable encasement material 35 such as plastic or the like may be formed upon the entire outer surface of the cell. The encapsulating material 35 is particularly advantageous when hydroscopic or reactive electrodes, such as potassium or the like, are utilized in the structure shown. In such cases electrical contact means such as buttons 36 and 37 may be formed on the surface of the electrodes 30 and 33, respectively, to provide means for providing electrical contact between the electrodes and the load. Any suitable material may be used for the contact buttons 36 and 37 such as aluminum, silver, nickel, platinum or the like.

It will be observed that since the electrolyte is in solid nonaqueous form practically any appropriate or desirable combination of electrolyte and electrode may be fabricated and no porous separator or membrane is required. Furthermore, since the electrolyte is in solid form, the entire cell may be easily encased in insulating plastics or the like to seal the entire cell from the atmosphere.

It will also be observed that since the electrolyte is non-aqueous, the cell is virtually immune to temperature changes. Conductivity of the electrolyte will not vary substantially from near cryogenic temperatures to temperatures near the melting point of the components of the cell.

Since the choice of cell structure is not limited to previously acceptable electrolytes, all thermodynamically possible cells can be fabricated and operate without water or other solvents. Accordingly, galvanic cells using cathodes of magnesium, aluminum, sodium, potassium, lithium and beryllium are feasible and economically practical using solid electrolytes such as magnesium sulfate, lead oxide, aluminum fluoride, cupric oxide, lithium chloride, beryllium sulfate and other suitable salts, oxides, sulfides, etc.

Any suitable method may be employed to fabricate solid bodies of the desired electrolyte material of the size and shape to be used in a cell. In the preferred embodiment the material is carefully dried and the radioisotope thoroughly mixed with the electrolyte. If the radioisotope is applied in solution form, the mixture should be thoroughly mixed and again dried. The mixture is then compacted at about the fusing temperature of the solid electrolyte at about 20,000 psi in a floating die. The pressure and temperature are then simultaneously reduced to a pressure of about 10,000 psi and 25° C, respectively, at a relatively linear pressure to temperature ratio. The pressure is then completely relieved and the compacted pellet extracted from the die. It will be understood that the manner of forming an electrolyte to pellet or slug and the size or shape thereof can be different from those described heretofore without deviating from the principles of the present invention.

Cells produced using electrolyte pellets formed as described above have been found to exhibit exceptional stability and reproducibility. The following examples are representative of cells produced in accordance with the invention utilizing electrolyte bodies formed as described above. In each example the pellet formed was about one inch in diameter and three millimeters thick.

EXAMPLE I

A Cu/CuCl/MgCl$_2$/Mg cell was constructed using fused pellets of CuCl and MgCl$_2$ prepared as described above and sandwiched between a sheet of copper and a sheet of magnesium in the structure of FIG. 3. Each salt pellet contained one microcurie of $^{137}$Cs. The device exhibited an open circuit voltage of 1.5 volts and a short circuit current of 20 milliamperes.

EXAMPLE II

A Cu/CuCl/MgCl$_2$/Mg cell was constructed as described in Example I. Each electrolyte pellet contained 9 microcuries of $^{137}$Cs and were dried at 35° C in a vacuum oven immediately following compaction. The device exhibited an open circuit voltage of 1.56 volts.

A control cell was simultaneously constructed which was identical in all respects but which contained no radioisotope. The control cell produced no measurable voltage or current.

EXAMPLE III

A Ag/AgI/I cell was constructed using a silver iodide pellet formed as described above containing 9 microcuries of $^{129}$I. The anode was a pellet of silver powder compressed at 10,000 psi and the cathode consisted of a pellet formed of two parts graphite and one part iodine by weight compacted as described above. The cell exhibited an open circuit voltage of 0.31 volts.

Several duplicate cells were constructed and their measured electrical characteristics were all within 10 percent of the characteristics of the initial cell.

EXAMPLE IV

Figure 4:
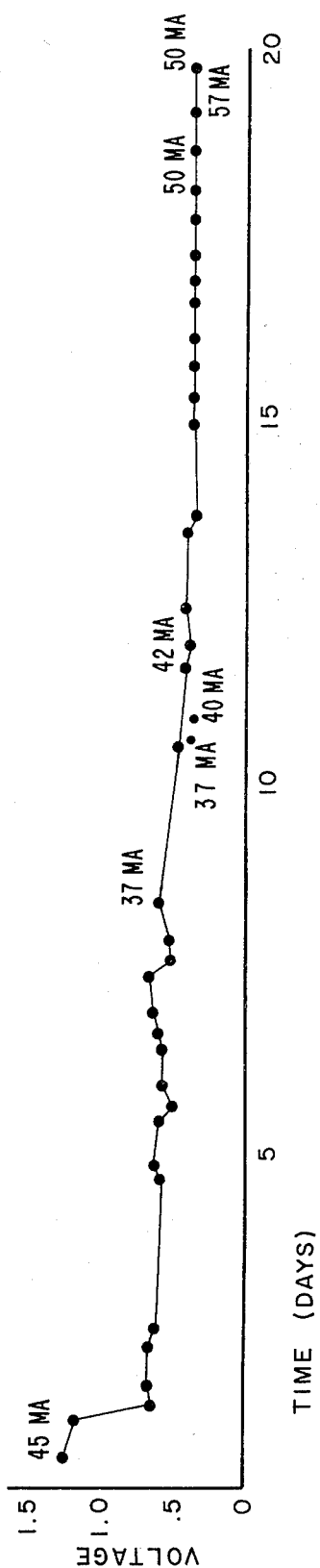
FIG. 4 is a graphic representation of the discharge curve of a $Zn/ZwCl_2/MnO_2$ cell produced in accordance with the invention.

A $Zn/ZnCl_2/MnO_2$ cell was constructed using compacted pellets of powdered zinc and manganese dioxide as electrodes. The electrolyte was a pellet of $ZnCl_2$ formed as described above containing 9 microcuries of $^{137}Cs$. This cell was placed under continuous load conditions of 48,000 ohms and current and voltage measurements taken periodically. Under these conditions the cell exhibited about 1.4 volts at 45 microamperes. Within 24 hours the voltage dropped to about 0.7 volt. During the next ten days the voltage gradually declined to about 0.5 volt. The cell was maintained under these load conditions and measurements taken periodically for seven months. During this time voltage was reduced to about 0.35 volt at 22 microamperes. The discharge curve was observed to be extremely flat. The discharge curve for the first twenty days is shown graphically in FIG. 4. Current observations are shown in the graph at points where current measurements were made.

It will be observed by those skilled in the art that in fabricating electrochemical cells in accordance with this invention the choice of electrolytes and electrodes is practically unlimited. It will be understood, however, that the concentration of radioactive isotope included in the electrolyte will be determined by the desired conductivity of the electrolyte material and the amount of impurity material which may be included therein without deleteriously affecting the properties of the electrolyte in an electrochemical cell.

The choice of electrodes is not limited to the pure elements, but may include amalgams, semiconductors, or organic compounds which have free energy potentials associated therewith. Likewise, the electrolyte material is not limited to salts of the electrode, but may include other ionic conductors such as metal oxides, sulfides, ionic organic materials and the like.

Any suitable source of radiation may be selected to provide radiation of the electrolyte. Alpha, beta or gamma sources, as well as high energy X-ray or neutron sources, depending on their specific activity, availability, half-life and compatiblity with the electrolyte will act as suitable energy sources. Pure beta emitters are generally preferred for safety reasons only.

It will be appreciated that the concentration of radioactive material in the electrolyte of this invention may vary with such factors as the specific activity of the isotope, energy of the radiation, initial conductivity of the electrolyte, absorption coefficient of the electrolyte, and conductivity required.

While the mechanism involved which causes increased conductivity of the electrolyte is not fully understood, it is believed that high energy radiation produces electric fields within the crystalline structure of the electrolyte. The electric fields appear to break bonding arrangements resulting in drastically increased ionic conductivity of the material.

In the preferred embodiment of the invention, a long half-life beta-emitter, such as $^{147}Pm$ or $^{137}Cs$, is dispersed in anhydrous electrolyte material. It has been discovered that the increase in conductivity of the electrolyte is approximately proportional to the beta activity. For example, two pellets of polycrystalline NaCl were prepared by compressing and drying at about 300° C. One pellet contained one microcurie $^{137}Cs$ per gram of NaCl. The other pellet contained one millicurie $^{137}Cs$ per gram of NaCl. The conductivity of the pellet containing one millicurie per gram was approximately 1000 times that of the pellet containing one microcurie per gram.

To further demonstrate the effect of radiation on a solid salt, identical pellets of silver iodide were formed as described above; one containing 0.9 microcurie $^{129}I$ and the other containing no radioisotope. The measured conductivity of the undoped pellet was $10^{-5}$ ohm $^{-1}cm^{-1}$ at 25° C at 1,000 Hz. The measured conductivity of the pellet containing $^{129}I$ was $1.7 \times 10^{-1}$ ohm $^{-1}$ $cm^{-1}$ at 25° D at 1,000 Hz.

As stated above, the concentration of radioactive material will depend upon many factors. Extremely low concentrations often produce dramatic results. For example most beta-emitters ordinarily increase the conductivity of most solid electrolytes by at least an order of magnitude in concentrations as low as 0.5 microcurie/cm$^3$. For most cells using a solid salt or metal oxide electrolytes doped with beta-emitter, about one microcurie to about one millicurie of radioisotope per gram of electrolyte produces satisfactory results. Within this range the achieved ionic conductivity is approximately proportional to the beta activity.

While the invention has been described with particular reference to the use of beta sources, other isotopes may also be used. For example, alpha or neutron sources may be used in appropriate concentrations. Likewise, gamma emitters may be used where appropriate shielding is available and the absorption cross section of the electrolyte is sufficient to make their use practical.

It should be noted that since the electrolyte must absorb only the radiation from the iostope source, inclusion of the source within the electrolyte is not essential. The radiation source may be in the electrode material or a part of the electrode material. For example, when a nickel electrode is used, $^{63}Ni$ may be deposited on the nickel electrode adjacent the electrolyte. The isotope will thus behave electrochemically as a nickel electrode, but will supply sufficient radiation to increase the conductivity of the electrolyte. Likewise, the radioactive element may be included in the electrolyte as one or more of the elements which constitutes the electrolyte material.

Through the practice of this invention extremely lightweight electrochemical cells may be designed using electrode materials of low equivalent weight. For example, a single electrolyte cell of the lithium/lithium fluoride/fluorine sturcture may be fabricated if the electrolyte contains sufficient radioactive material to increase the conductivity to acceptable values.

Accordingly, cells may be designed to utilize the unique characteristics of practically any combination of electrode materials. Electrolytes selected without regard to ionic conductivity in their natural state may then be admixed with appropriate radiation sources to produce an electrochemical cell as described herein. Furthermore, since interfering side reactions are avoided by eliminating water or other solutions, many reversible cells can be produced.

While the invention has been described with particular reference to specific embodiments thereof, it will be understood that the forms of the invention shown and described in detail are to be taken as prefered embodiments of same and that various changes and modifications may be resorted to without departing from the spirit and scope of the invention as defined by the appended claims.

What is claimed is:

1. A galvanic cell comprising a pair of electrodes contacting a solid ionic conductor and a radiation source positioned in said cell to direct radiation through said solid ionic conductor in quantities sufficient to materially increase its ionic conductivity to thereby enhance development of voltage and current in said cell.

2. A cell in accordance with claim 1 in which said radiation source comprises radioactive material admixed with said solid ionic conductor.

3. A cell in accordance with claim 1 in which said radiation source comprises radioactive material which is admixed with one of said electrodes.

4. The device defined in claim 1 wherein said radiation source is a beta-emitter.

5. The device defined in claim 1 wherein said ionic conductor contains not less than about 0.5 microcurie of said radiation source per gram of ionic conductor.

6. The device defined in claim 2 wherein said solid ionic conductor contains from about one microcurie to about 1 millicurie of said radiation source per gram of said solid ionic conductor.

7. The device defined in claim 1 wherein said solid ionic conductor comprises a pair of bodies interposed between a pair of electrodes, each of said bodies being an anhydrous salt of the electrode adjacent thereto.

8. The device defined in claim 7 wherein said radiation source is $^{137}$Pm disposed within at least one of said pair of bodies.

9. The device defined in claim 7 wherein said radiation source is $^{137}$Cs disposed within at least one of said pair of bodies.

10. An electrochemical galvanic cell comprising:
    a. first and second spaced apart electrodes of different free energy potential;
    b. a solid body of electrolyte material disposed between and contacting said first and second electrodes; and
    c. a radioactive source positioned in said cell to direct radiation through said solid electrolyte in quantities sufficient to materially increase its ionic conductivity to thereby enhance development of voltage and current in said cell.

11. The device defined in claim 10 wherein said radioactive source is a beta-emitter disposed within said solid body of electrolyte material.

12. The device defined in claim 10 wherein at least one of said electrodes is fluid.

13. The device defined in claim 10 including means positioned between said spaced apart electrodes and defining a cavity in cooperation with said spaced apart electrodes for encasing said solid body of electrolyte material.

14. The device defined in claim 10 including shielding means encasing said spaced apart electrodes, said electrolyte material and said radioactive source.

* * * * *